US012470486B2

(12) United States Patent
Milgrom et al.

(10) Patent No.: US 12,470,486 B2
(45) Date of Patent: Nov. 11, 2025

(54) ADAPTIVE ROUTING FOR ASYMMETRICAL TOPOLOGIES

(71) Applicant: MELLANOX TECHNOLOGIES, LTD., Yokneam (IL)

(72) Inventors: Michael Gandelman Milgrom, Aventura, FL (US); Daniel Klein, Tel Aviv (IL); Eitan Zahavi, Zichron Yaakov (IL); Vladimir Koushnir, Rishon le Zion (IL); Lion Levi, Yavne (IL); Gil Mey-Tal, Tel Aviv (IL); Aleksandr Minchiu, Bnei Brak (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 533 days.

(21) Appl. No.: 17/835,696

(22) Filed: Jun. 8, 2022

(65) Prior Publication Data

US 2023/0403234 A1 Dec. 14, 2023

(51) Int. Cl.
*H04L 47/122* (2022.01)
*H04L 45/00* (2022.01)
*H04L 45/02* (2022.01)

(52) U.S. Cl.
CPC ............ *H04L 47/122* (2013.01); *H04L 45/02* (2013.01); *H04L 45/22* (2013.01)

(58) Field of Classification Search
CPC ....... H04L 45/02; H04L 45/22; H04L 45/125; H04L 47/122
See application file for complete search history.

(56) References Cited

U.S. PATENT DOCUMENTS

| 9,553,794 B1* | 1/2017 | Zolla | H04L 45/02 |
| 2006/0182034 A1* | 8/2006 | Klinker | H04L 45/247 370/248 |
| 2012/0063319 A1* | 3/2012 | Christin | H04L 45/306 370/235 |
| 2015/0381459 A1* | 12/2015 | Xiao | H04L 45/125 370/253 |
| 2016/0080230 A1* | 3/2016 | Anand | G06F 16/285 709/224 |
| 2020/0028786 A1* | 1/2020 | Chachmon | H04L 45/38 |
| 2022/0368625 A1* | 11/2022 | Smith | H04L 45/24 |

* cited by examiner

*Primary Examiner* — Elton Williams
(74) *Attorney, Agent, or Firm* — Sheridan Ross P.C.

(57) ABSTRACT

An apparatus, system, and method include, for each of two or more switches of a communication network, identifying a set of routing paths from the switch to a destination node based on a topology associated with the communication network. The set of routing paths include a first subset of routing paths and a second subset of routing paths. The topology includes an indication of a convergence of the first subset of routing paths at a node between the switch and the destination node. The apparatus, system, and method include allocating a data flow to a first routing path of the first subset of routing paths and a second routing path of the second subset of routing paths according to a target data flow rate common to the first routing path and the second routing path.

20 Claims, 6 Drawing Sheets

ADAPTIVE ROUTING FOR ASYMMETRICAL TOPOLOGIES

FIELD OF TECHNOLOGY

The present disclosure relates to communication networks, and more particularly, to adaptive routing techniques.

BACKGROUND

Some routing techniques include distributing traffic to routing paths of a communication network based on congestion associated with the routing paths. Improved techniques for distributing and routing traffic are desired which help to improve the overall performance of the communication network.

SUMMARY

The described techniques relate to methods, systems, devices, and apparatuses that support adaptive routing for asymmetrical topologies.

An apparatus is provided including: a processor; memory in electronic communication with the processor; and instructions stored in the memory. The instructions are executable by the processor to, for each of two or more switches of a communication network, identify a set of routing paths from the switch to a destination node based on a topology associated with the communication network, where the set of routing paths include a first subset of routing paths and a second subset of routing paths, and the topology includes an indication of a convergence of the first subset of routing paths at a node between the switch and the destination node. The instructions are executable to allocate a data flow to a first routing path of the first subset of routing paths and a second routing path of the second subset of routing paths according to a target data flow rate common to the first routing path and the second routing path.

A system is provided including: a communication network including a controller and two or more switches. The communication network includes, for each of the two or more switches, a set of routing paths from the switch to a destination node. The set of routing paths include: a first subset of routing paths converging at a node between the switch and the destination node; and a second subset of routing paths. The controller allocates a data flow to a first routing path of the first subset of routing paths and a second routing path of the second subset of routing paths according to a target data flow rate common to the first routing path and the second routing path.

A method is provided including, for each of two or more switches of a communication network, identifying a set of routing paths from the switch to a destination node based on a topology associated with the communication network, where the set of routing paths include a first subset of routing paths and a second subset of routing paths, and the topology includes an indication of a convergence of the first subset of routing paths at a node between the switch and the destination node. The method includes allocating a data flow to a first routing path of the first subset of routing paths and a second routing path of the second subset of routing paths according to a target data flow rate common to the first routing path and the second routing path.

Examples may include one of the following features, or any combination thereof.

Some examples of the apparatus, system, and method described herein may include comparing an instantaneous data flow rate of one or more routing paths of the set of routing paths to the target data flow rate, where allocating the data flow to the first routing path and the second routing path is based on a result of the comparison.

Some examples of the apparatus, system, and method described herein may include identifying, based on the topology, the convergence of the first subset of routing paths, where allocating the data flow to the first routing path and the second routing path is based on identifying the convergence.

Some examples of the apparatus, system, and method described herein may include selecting between the first routing path and at least one other routing path of the first subset of routing paths based on the destination node. Some examples of the apparatus, system, and method described herein may include disabling a port associated with the at least one other routing path.

Some examples of the apparatus, system, and method described herein may include comparing a congestion state of the communication network to a set of criteria, where allocating the data flow to the first routing path, disabling the port associated with the at least one other routing path, or both is based on a result of the comparison.

Some examples of the apparatus, system, and method described herein may include comparing a data throughput value of at least one other routing path of the second subset of routing paths to a threshold value; and allocating the data flow to the at least one other routing path according to the target data flow rate or refraining from allocating the data flow to the at least one other routing path, based on a result of the comparison.

Some examples of the apparatus, system, and method described herein may include comparing an input flow rate at the node to an output flow rate capability at the node, where allocating the data flow to the first routing path and the second routing path according to the target data flow rate is based on a result of the comparison.

Some examples of the apparatus, system, and method described herein may include offloading data traffic from at least one other routing path of the first subset of routing paths to the first routing path.

Some examples of the apparatus, system, and method described herein may include comparing an input flow rate at the destination node to a maximum line rate associated with the topology, where allocating the data flow to the first routing path and the second routing path according to the target data flow rate is based on a result of the comparison.

Some examples of the apparatus, system, and method described herein may include traversing the communication network; and identifying the topology based on traversing the communication network.

In some examples of the apparatus, system, and method described herein, identifying the topology includes accessing a data table indicating the topology.

DETAILED DESCRIPTION

The ensuing description provides example aspects of the present disclosure, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims. Various aspects of the present disclosure will be described herein with reference to drawings that are schematic illustrations of idealized configurations.

Some adaptive routing techniques operate under an assumption that, at every node in a network and in the absence of congestion, all routing paths are equivalent. Implementations of such adaptive routing techniques, under the assumption of symmetry among the routing paths, include distributing traffic to the least congested paths of the network without consideration of the topology of the network. The topology of the network includes the elements (e.g., nodes, communication links between the nodes, etc.) of the network and the arrangement thereof.

In assuming symmetry, and failing to consider the topology of the network, such routing techniques fail to address congestion patterns which may otherwise be avoidable. For example, for networks in which the topology includes asymmetrical routing paths, congestion patterns may be present and routing paths may remain underutilized (e.g., with respect to data flow rate capacity). Additionally, for routing paths converging at a node of the network, the data flow into the node may exceed the output flow rate capability of the same node, resulting in bottleneck conditions. Such conditions may result in significantly degraded performance in association with communications across the network.

Aspects described herein support adaptive routing techniques for asymmetrical topologies. The routing techniques may include identifying a topology of a network and a current state of congestion across the network. The network may include multiple switches for routing data traffic from source nodes to multiple destination nodes. Based on the topology, a controller may identify, for each of the switches, routing paths that converge prior to a destination node. The controller may identify a bottleneck condition at converging routing paths where, for example, input data flow rate at the point of convergence is greater than a maximum output data flow rate.

Factoring in the bottleneck condition and underutilized bandwidth of other routing paths, the controller may allocate (e.g., reallocate) a data flow among the routing paths of the network. For example, the controller may exclude one of the converging routing paths when allocating the data flow among the routing paths, thereby eliminating or avoiding the bottleneck condition. The routing techniques support achieving, at some or all nodes between a switch and a destination node, a maximum line rate associated with the topology. The routing techniques support achieving the maximum line rate at the destination node.

According to example aspects of the present disclosure, the controller may select routing paths in a randomized manner according to a distribution based on the following parameters: a selected subset of routing paths included among some or all available routing paths; and the level of congestion along every routing path. Accordingly, for example, at every node, each incoming packet is forwarded along a path according to the randomized selection.

Aspects of the disclosure are further illustrated by and described with reference to apparatus diagrams, system diagrams, and flowcharts that relate to adaptive routing for asymmetrical topologies.

Figure 1:
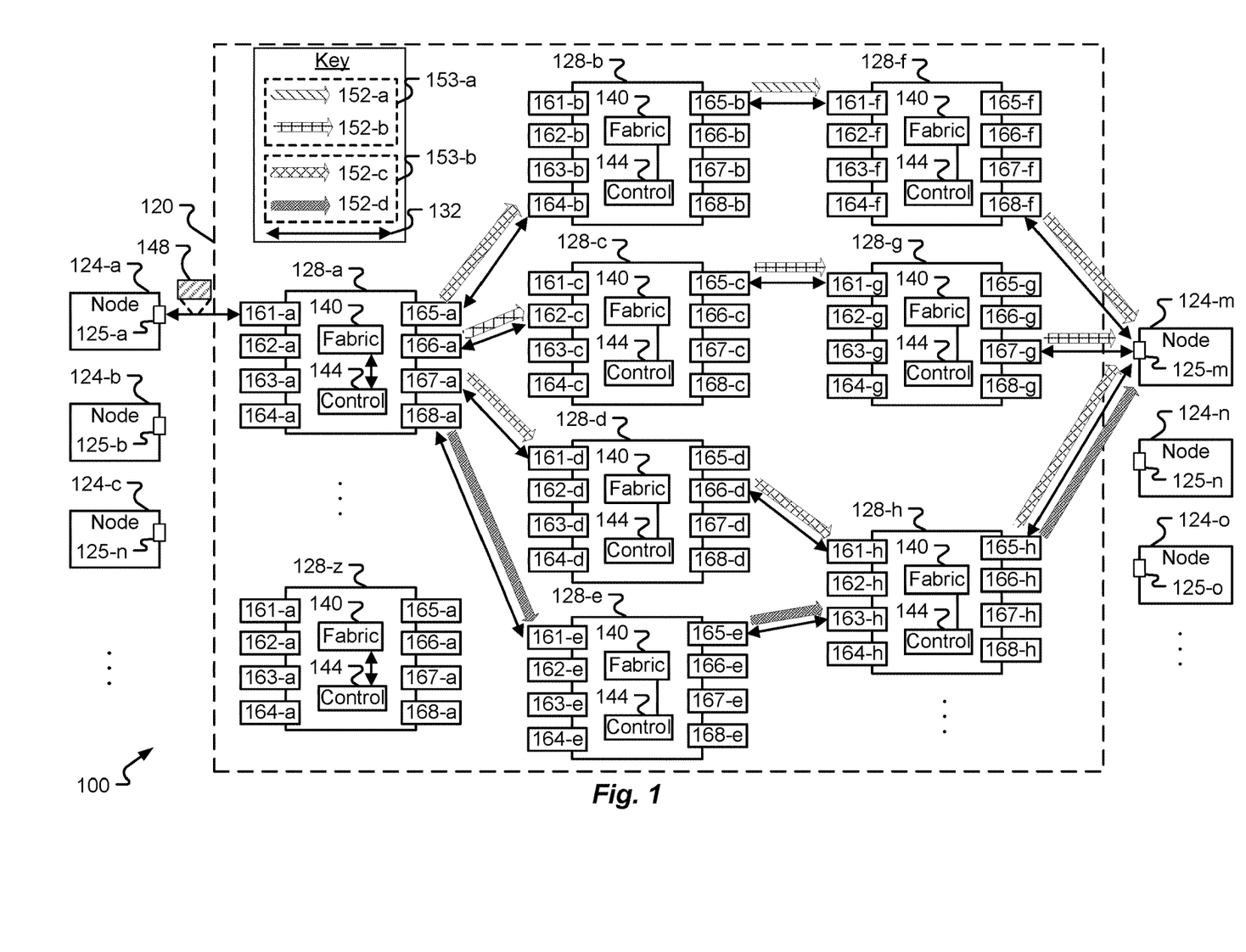
FIG. 1 illustrates a system in accordance with aspects of the present disclosure.

FIG. 1 illustrates an example of system 100 that supports adaptive routing for asymmetrical topologies in accordance with aspects of the present disclosure. The system 100 includes a communication network 120 and various nodes 124.

The communication network 120 may support the exchange of data packets between nodes 124 (e.g., nodes 124-a through node 124-o) of the system 100. Each node 124 may be, for example, a Host Channel Adapter (HCA) or other Network Interface Controller (NIC) of a computing device (e.g., a computer). Each node 124 (e.g., node 124-a) may include one or more ports 125 (e.g., node 125-a) via which the node 124 may transmit or receive data packets.

The communication network 120 may include switches 128 (also referred to herein as network switches). In an example, a switch 128 (e.g., switch 128-a) includes a set of ports 161 through 168 (e.g., port 161-a through port 168-a), switch fabric circuitry 140 (also referred to herein as fabric 140 in FIG. 1), and control circuitry 144. Control circuitry 144 (also referred to herein as control 144 in FIG. 1) controls and configures the switch 128. For example, each of the ports 161 through 168 may be configured (e.g., by control circuitry 144) to receive and/or transmit data packets. Switch fabric circuitry 140 may be configured (e.g., by control circuitry 144) to forward data packets between different ports of the switch 128. Each switch 128 may also be referred to herein as a node.

According to example aspects of the present disclosure, control circuitry 144 may implement aspects of the adaptive routing techniques for asymmetrical topologies as described herein. In some aspects, the control circuitry 144 may be specific to each switch 128. Additionally, or alternatively, the control circuitry 144 of some or all switches 128 may be included in higher level control circuitry capable of controlling some or all of the switches 128.

The communication network 120 may support network topologies such as a Fat Tree (FT) topology. In the examples described herein, the communication network 120 includes an asymmetrical network topology, for example, as illustrated at FIG. 1. Additional and/or alternative implementations of the communication network 120 may support a bipartite topology such as, for example, a full bipartite topology (e.g., every node in a subset of nodes is directly connected to every node in another subset of nodes) or a partial bipartite topology. Additional and/or alternative implementations of the communication network 120 may support implementations including any suitable hierarchical topology (e.g., dragonfly topology).

The communication network 120 may include any suitable type of known communication medium or collection of communication media and may use any suitable type of protocols to transport messages, signals, and/or data between endpoints. In some aspects, the communication network 120 may include wired communications technologies, wireless communications technologies, or any combination thereof.

The Internet is an example of a network (e.g., communication network 120) supported by the system 100, and the network may constitute an Internet Protocol (IP) network consisting of multiple computers (e.g., nodes 124), computing networks, and other devices (e.g., switches 128, etc.) located in multiple locations. Other examples of networks supported by the system 100 may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VoIP) network, Ethernet, InfiniBand™, a cellular network, and any other suitable type of packet-switched or circuit-switched network known in the art. In some cases, the system 100 may include of any combination of networks or network types. In some aspects, the networks may include any combination of communication mediums such as coaxial cable, copper cable/wire, fiber-optic cable, or antennas for communicating data (e.g., transmitting/receiving data). The communication network 120 may support lossless network protocols.

In an example, the communication network 120 may operate in accordance with the InfiniBand™ standard. Additionally, or alternatively, the communication network 120 may operate in accordance with any other suitable communication protocol or standard, such as IPv4, IPv6 (which both support ECMP) and "controlled Ethernet." In some aspects, the communication network 120 may be associated with an InfiniBand™ subnet and be managed by a subnet manager. The subnet manager may be implemented by a processor. For example, the tasks of the subnet manager may be implemented, for example, by software (e.g., executed code) running on one or more of processors (e.g., processor 340 later described with reference to FIG. 3) of one or more switches 128 and/or on a separate processor. The subnet manager may configure switch fabric circuitry 140 and/or processors of various switches 128 in association with implementing the techniques described herein.

Aspects of the present disclosure support routing a flow of data packets 148 from a node 124-*a* (e.g., a source node) to a node 124-*m* (e.g., a destination node) of the system 100. In an example, the flow of data packets 148 originate from the node 124-*a* and are addressed to the node 124-*m*. With respect to routing the flow of data packets 148, the system 100 supports the forwarding of the data packets 148 from a port 125-*a* of the node 124-*a* to a port 125-*m* of the node 124-*m*, over any combination of routing paths 152 of the communication network 120. Aspects of the present disclosure support routing flows of data packets between any quantity of source nodes (e.g., node 124-*a*, node 124-*b*, node 124-*c*, etc.) and destination nodes (e.g., node 124-*m*, node 124-*n*, node 124-*o*, etc.).

The network topology of the communication network 120 supports multiple possible routing paths 152 (e.g., routing path 152-*a* through routing path 152-*d*) from the node 124-*a* to the node 124-*m*. For example, for a switch 128-*a* connected to the node 124-*a*, the network topology supports multiple routing paths 152 from the switch 128-*a* to the node 124-*m*. That is, for example, the switch 128-*a* has multiple candidate ports (e.g., ports 161-*a* through 168-*a*) and multiple corresponding routing paths 152 via which data packets 148 are routable to the node 124-*m*.

Each of the routing paths 152 traverses one or more switches 128 and one or more network links 132. Each network link 132 may also be referred to as a hop. For example, each network link 132 may be a connection included in a string of connections linking multiple devices (e.g., linking multiple nodes 124, multiple switches 128, etc.).

Aspects of the present disclosure support adaptive routing between any of the nodes 124 over any combination of routing paths 152 of the communication network 120. Aspects of the present disclosure support applying the techniques described herein, as described with reference to the switch 128-*a*, to some or all switches 128 of the communication network 120.

Aspects of the present disclosure support applying the adaptive routing techniques described herein to some or all nodes (e.g., nodes 124, switches 128, etc.) of the communication network 120 in many possible network topologies. For example, the adaptive routing techniques described herein support coordinating, for some or all nodes of the network, respective port selections. Example aspects of the adaptive routing techniques as applied to the switches 128 may be similarly implemented in association with other devices (e.g., routers, GPUs with multiple ports, etc.). The system 100 may include any quantity of components (e.g., nodes 124, switches 128, links 132, etc.) described herein.

Figure 2A:
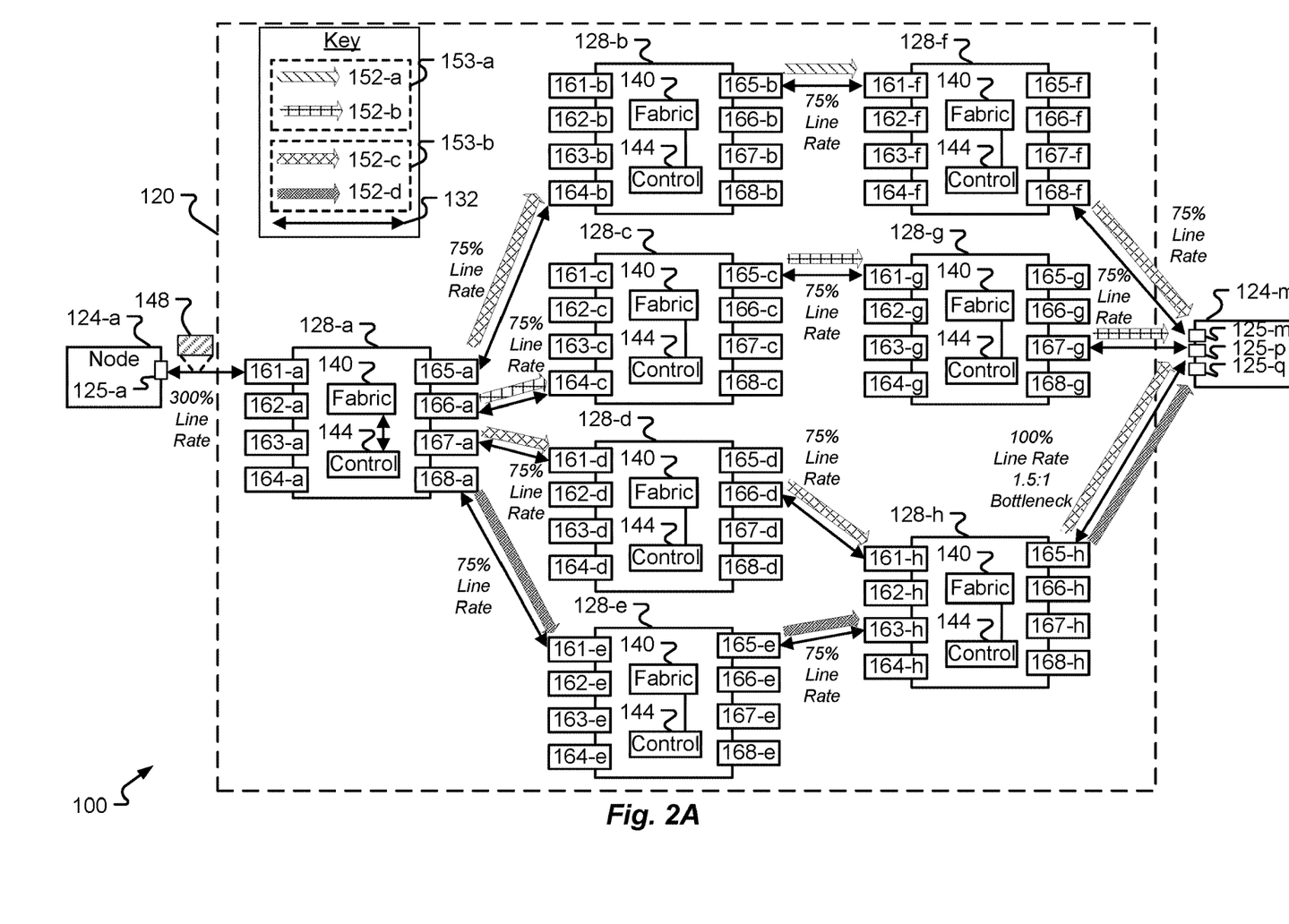
FIGS. 2A through 2C illustrate examples of the system in accordance with aspects of the present disclosure
Figure 2B:
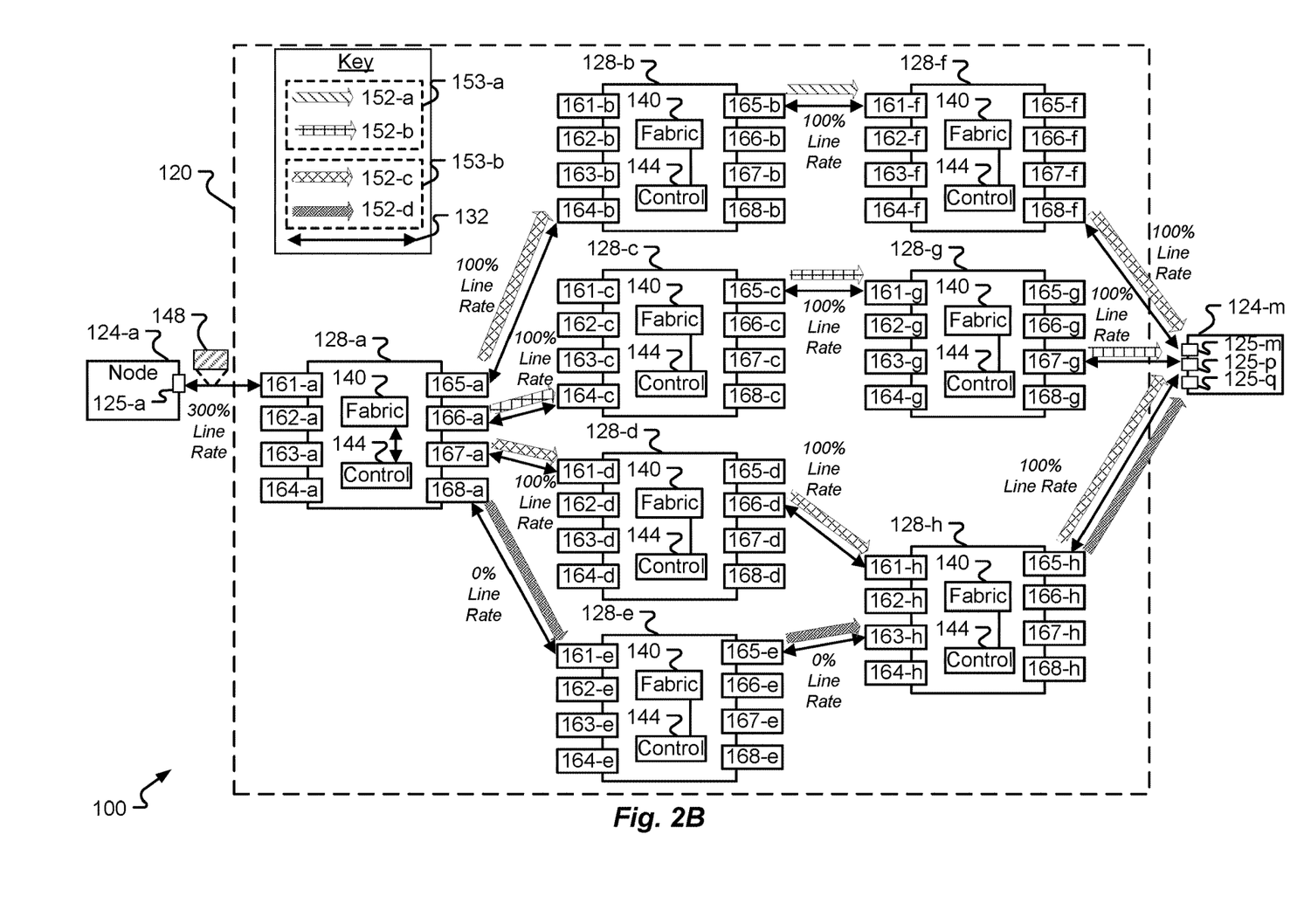
Figure 2C:
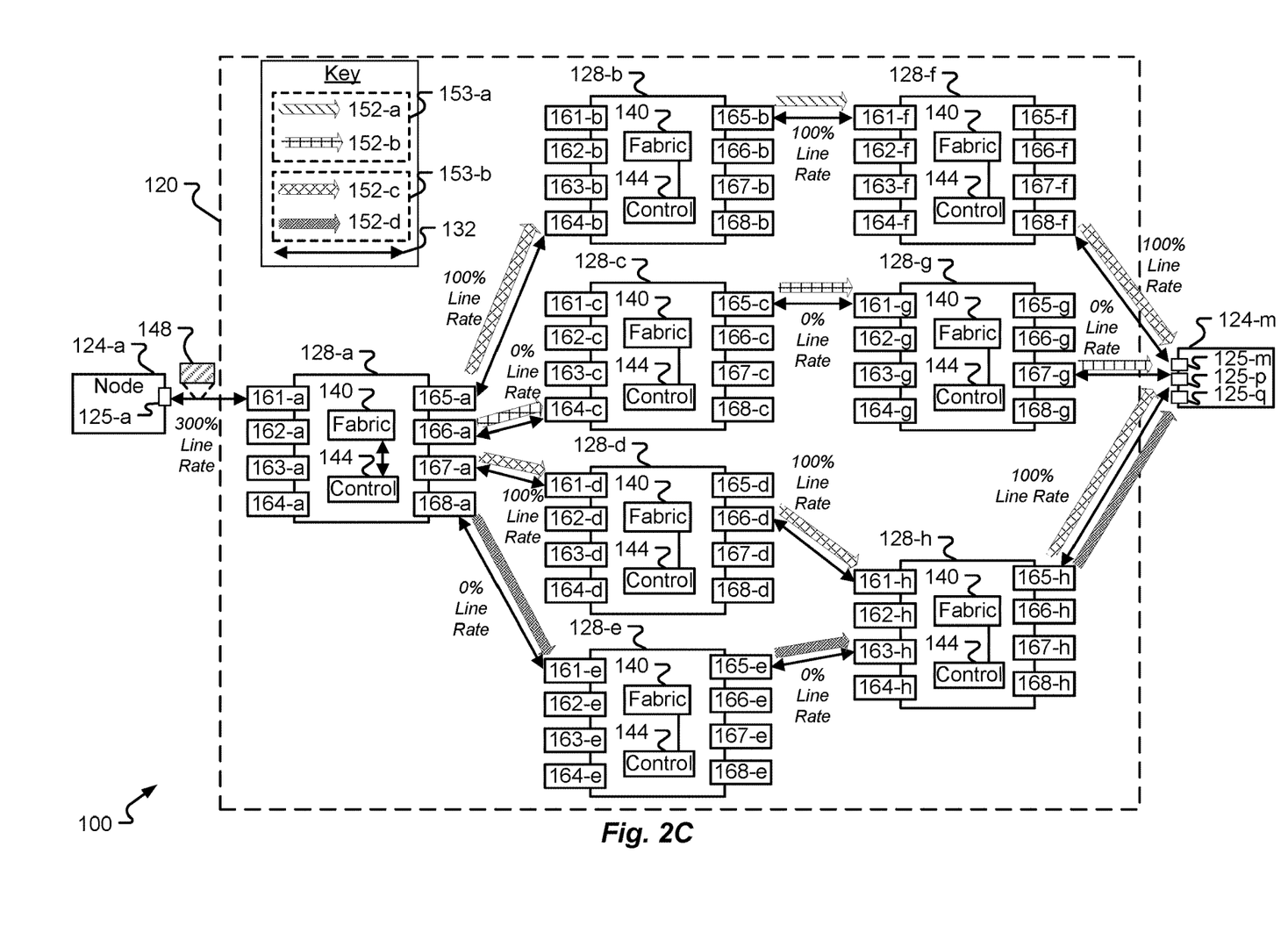

FIGS. 2A through 2C illustrate examples of the system 100 that support adaptive routing for asymmetrical topologies in accordance with aspects of the present disclosure. An example implementation for adaptive routing for asymmetrical topologies is described herein with reference to FIGS. 1A and 2A through 2C.

The communication network 120 may include a controller (e.g., control circuitry 144) and multiple switches 128 (e.g., switch 128-*a* through switch 128-*z*). In some aspects, the controller may be implemented by higher level control circuitry capable of controlling some or all of the switches 128. Additionally, or alternatively, the system 100 may include controllers (e.g., control circuitry 144) specific to each switch 128. In an example, the controller (or controllers) may be implemented by aspects of a controller 320 described with reference to FIG. 3. The controller (or control circuitry 144) may control the switches 128 to apply a routing plan, in which the switches 128 forward data packets via various routing paths 152 of the communication network 120. The controller may configure the switch fabric circuitry 140 of the switches 128 in association with the routing plan.

In an example, switch 128-*a* may be coupled (e.g., electronically coupled, coupled via a link 132) to a node 124-*a* via a link 132. The communication network 120 includes, for the switch 128-*a*, a set of routing paths 152 (e.g., routing path 152-*a* through routing path 152-*d*) from the switch 128-*a* to a node 124-*m*. The set of routing paths 152 may include multiple subsets 153 of routing paths 152. For example, the set of routing paths 152 may include a subset 153-*a* (e.g., routing path 152-*a* and routing path 152-*b*) and a subset 153-*b* (e.g., routing path 152-*c* and routing path 152-*d*).

The communication network 120 may include an asymmetrical topology. For example, routing path 152-*a* and routing path 152-*b* are asymmetrical with respect to routing path 152-*c* and 152-*d*. Routing path 152-*a* and routing path 152-*b* do not converge with any other routing path 152 prior to the node 124-*m*, whereas routing path 152-*c* and routing path 152-*d* converge at a node (e.g., switch 128-*h*) between the switch 128-*a* and the node 124-*m*.

In an example implementation in which the communication network 120 operates in accordance with the InfiniBand™ standard, the controller (e.g., subnet manager) may traverse the communication network 120 in association with identifying the topology. For example, based on the traversal of the communication network 120, the subnet manager may build a corresponding topology file indicative of the topology. In an alternative example implementation in which the communication network 120 operates in accordance with the Ethernet standard, the controller may access a data table (e.g., stored on a memory, a database, etc.) indicating the topology.

The controller may identify, based on the topology associated with the communication network 120, whether any of the routing paths 152 converge prior to the node 124-*m*. For example, based on the topology, the controller may identify the convergence of routing path 152-*c* and routing path 152-*d*. Based on the topology, the controller may identify that routing path 152-*a* and routing path 152-*b* do not converge prior to the node 124-*m*. The controller may detect or calculate instantaneous data flow rates of the routing paths 152. For example, the controller may detect or calculate respective instantaneous data flow rates at any of the components (e.g., nodes 124, switches 128, etc.) included in the routing paths 152.

According to example aspects of the present disclosure, the controller may control the allocation of a data flow (e.g., of data packets 148) originating from the node 124-*a* among the routing paths 152. For example, the controller may allocate the data flow among the routing paths 152 via the switch 128-*a*. In some aspects, the controller may allocate the data flow based on identified convergences of routing paths 152. That is, for example, the controller may apply an identified convergence as a trigger condition for allocating or reallocating the data flow among the different routing paths 152 as described herein.

In another aspect, the controller may allocate the data flow based on a comparison of the instantaneous data flow rate of one or more routing paths 152 to a target data flow rate. The target data flow rate may be, for example, the line rate associated with the topology of the communication network 120. Accordingly, for example, the controller may apply a comparison result of the instantaneous data flow rate of the routing paths 152 to the target data flow rate as a trigger condition for allocating or reallocating the data flow among the different routing paths 152. Examples of allocating the data flow are described herein.

In an example, the controller may compare instantaneous flow rates of the routing paths 152 (e.g., routing path 152-*a* through routing path-*d*) to the target data flow rate (e.g., 100% line rate). For example, referring to FIG. 2A, the controller may identify that the data flow rate at each of the routing paths 152 is 75% of the target data flow rate (i.e., 75% of the line rate). Referring to FIG. 2B, the controller may allocate the data flow to routing path 152-*a*, routing path 152-*b*, and routing path 152-*c* according to the target data flow rate (i.e., 100% of the line rate). In an example, the controller may allocate the data flow to routing path 152-*a*, routing path 152-*b*, and routing path 152-*c* according to the target data flow rate, while refraining from allocating the data flow to the routing path 152-*d*. In some aspects, the controller may offload data traffic from routing path 152-*d* to routing path 152-*c*. For purposes of the examples described herein, routing path 152-*c* may be referred to as a selected routing path 152, and routing path 152-*d* may be referred to as a non-selected routing path 152.

Additionally, or alternatively, referring to FIG. 2A, the controller may identify the convergence of routing path 152-*c* and routing path 152-*d* at switch 128-*h*. Referring to FIG. 2B, the controller may allocate the data flow to routing path 152-*a*, routing path 152-*b*, and/or routing path 152-*c* according to the target data flow rate (i.e., 100% of the line rate), based on the identified convergence. That is, for example, based on the identified convergence, the controller may allocate the data flow to routing path 152-*a*, routing path 152-*b*, and routing path 152-*c* according to the target data flow rate, while refraining from allocating the data flow to the routing path 152-*d*.

Aspects of the present disclosure support additional and/or alternative criteria based on which the controller may allocate the data flow among the routing path 152-*a*, routing path 152-*b*, and/or routing path 152-*c* and refrain from allocating the data flow to routing path 152-*d*.

Example criteria may include a data throughput value at switch 128-*h*. In an example, referring to FIG. 2A, the controller may compare an input flow rate at switch 128-*h* (e.g., 150% line rate, based on 75% line rate at port 161-*h* and 75% line rate at port 163-*h*) to an output flow rate capability (e.g., 100% line rate) at the switch 128-*h*. Based on the comparison result (e.g., the input flow rate is greater than the output flow rate capability), the controller may allocate the data flow to the routing path 152-*c* (or alternatively, routing path 152-*d*), the routing path 152-*a*, and the routing path 152-*b* according to the target data flow rate (i.e., 100% line rate), as illustrated at FIG. 2B.

Other example criteria include congestion states or availability of routing path 152-*a* and/or routing path 152-*b* (e.g., the non-converging routing paths 152). For example, the controller may identify that the routing path 152-*b* is already in use (e.g., congested, unavailable, etc.) due to another data flow associated with another source node. In an example, the controller may compare a data throughput value of the routing path 152-*b* to a threshold data throughput value.

Based on a comparison result in which the data throughput value of the routing path 152-*b* is greater than or equal to the threshold data throughput value, the controller may allocate the data flow (e.g., of data packets 148) to routing path 152-*a*, routing path 152-*b*, and routing path 152-*c* according to the target data flow rate, while refraining from allocating the data flow to the routing path 152-*d* as described herein (as illustrated at FIG. 2B). In another example, based on a comparison result in which the data throughput value of the routing path 152-*b* is less than the threshold data throughput value, the controller may allocate the data flow to routing path 152-*a* and routing path 152-*c* according to the target data flow rate (i.e., 100% line rate), while refraining from allocating the data flow to routing path 152-*b* and routing path 152-*d* (i.e., 0% line rate), as illustrated at FIG. 2C.

Some other example criteria include a maximum line rate associated with the topology of the communication network 120. For example, the topology may support up to 300% line rate from the switch 128-*a* to the node 124-*m* (e.g., destination node). Referring to FIG. 2A, the controller may calculate that the input flow rate at the node 124-*m* is equal to 250% of the line rate. For example, the controller may calculate that the aggregate flow rate at multiple ports 125 (e.g., port 125-*m*, port 125-*p*, and port 125-*q*) of the node 124-*m* is equal to 250% of the line rate. Each port 125 of the system 100 may support up to 100% line rate.

The controller may compare the input flow rate at the node 124-*m* to the maximum line rate (e.g., 300% line rate). Based on a comparison result in which the input flow rate is less than the maximum line rate, the controller may allocate the data flow to routing path 152-*a*, routing path 152-*b*, and routing path 152-*c* according to the target data flow rate (i.e., 100% line rate), while refraining from allocating the data flow to the routing path 152-*d* (i.e., 0% line rate) as described herein, as illustrated at FIG. 2B. In another example, based on a comparison result in which the input flow rate is equal to the maximum line rate, the controller may refrain from reallocating the data flow among the convergent routing paths 152 (e.g., maintain the respective data flows associated with routing path 152-*c* and routing path 152-*d*).

Accordingly, for example, allocation of the data flow to routing path 152-*a*, routing path 152-*b*, and routing path 152-*c* may achieve an even distribution of the bandwidth among routing path 152-*a*, routing path 152-*b*, and routing path 152-*c*. The allocation of the data flow to routing path 152-*a*, routing path 152-*b*, and routing path 152-*c* (as illustrated at FIG. 2B) avoids the bottleneck condition (illustrated at FIG. 2A) described herein that may otherwise result due to the convergence of routing path 152-*c* and routing path 152-*d*.

In some aspects, among convergent routing paths 152 (e.g., routing path 152-*c* and routing path 152-*d*), the controller may select a routing path 152 (e.g., routing path 152-*c*) over another routing path 152 (e.g., routing path 152-*d*) based on any suitable combination of criteria, examples of which are described herein. For example, the controller may select routing path 152-*c* over routing path 152-*d* based on an address of the node 124-*m* (e.g., the destination node). In another example, the controller may select routing path 152-*c* over routing path 152-*d* based on a comparison of queues at one or more output ports (e.g., port 167-*a*, port 166-*d*) associated with routing path 152-*c* and queues at one or more output ports (e.g., port 168-*a*, port 165-*e*) associated with routing path 152-*d*. The controller may identify congestion for the routing path 152-*c* and routing path 152-*d*, based on the queues, and the controller may assign priority to the routing path 152 (e.g., routing path 152-*c*, routing path 152-*d*) having a relatively less congested output.

In some examples, the controller may select routing path 152-*c* over routing path 152-*d* based on a comparison of respective bandwidths. For example, the controller may identify that routing path 152-*c* has a relatively higher bandwidth compared to routing path 152-*d*, and the controller may assign priority to the routing path 152-*c*. In some other examples, the controller may identify that routing path 152-*d* is shared by more potential destination nodes compared to routing path 152-*c*, and the controller may demote routing path 152-*d* in terms of priority.

In some cases, in association with allocating the data flow to routing path 152-*c* (and not routing path 152-*d*), the controller may disable a port (e.g., port 168-*a*) associated with routing path 152-*d*. For example, the controller may compare a congestion state of the communication network 120 to a set of criteria. In an example, based on a result of the comparison, the controller may allocate the data flow to routing path 152-*c*, refrain from allocating the data flow to routing path 152-*d*, and/or disable the port (e.g., port 168-*a*) associated with routing path 152-*d*. In an example, the criteria may include a state of congestion at the outputs of routing path 152-*c* and routing path 152-*d* (i.e., occupancy of queues). In some aspects, the criteria may include knowledge of congestion further down each of the routing path 152-*c* and routing path 152-*d*. For example, the criteria may include a determination of whether a queue is full in a switch 128 (e.g., switch 128-*h*) relatively closer to node 124-*m*.

In some cases, the criteria may include predicted traffic associated with each of the routing path 152-*c* and routing path 152-*d*. For example, the system 100 may support predictive models based on flow lengths. In an example, the system 100 may predict a large amount of traffic (e.g., above a threshold value) is expected to flow through routing path 152-*d*, and the system 100 may predict a small amount of traffic (e.g., below a threshold value) is expected to flow through routing path 152-*c*. Accordingly, for example, the system 100 may identify the routing path 152-*c* as a routing path that is relatively less likely to be utilized by heavy flows. The controller may decide to preempt future congestion by prioritizing allocation of the data flow to the routing path 152-*c*.

Additionally, or alternatively, to the examples described herein, the controller may redistribute the allocation of the data flow between the routing paths 152 (e.g., routing path 152-*a* through routing path 152-*d*), without excluding any of the convergent routing paths (e.g., without excluding routing path 152-*c* or routing path 152-*d*). For example, the controller may allocate the data flow to routing path 152-*a* at 100% line rate, allocate the data flow to routing path 152-*b* at 100% line rate, allocate the data flow to routing path 152-*c* at 50% line rate (or another suitable percentage of line rate), and allocate the data flow to routing path 152-*d* at 50% line rate (or another suitable percentage of line rate) such that the input flow rate at the node 124-*m* equals the maximum line rate (e.g., 300% line rate). Accordingly, for example, the controller may reduce the aggregated data flow rate of routing path 152-*c* and routing path 152-*d* (e.g., reduce data flow rates at ports 167-*a* and 168-*a* of the switch 128-*a*), allocate the data flow to routing path 152-*a* at 100% line rate, and allocate the data flow to routing path 152-*b* at 100% line rate. In some aspects, the system 100 may support such an implementation in exchange for increased cost (e.g., processing overhead) at the switch 128-*a*.

The communication network 120 may include any suitable quantity of switches 128, routing paths 152, and nodes 124. Example aspects of the present disclosure described with reference to switch 128-*a*, routing paths 152, and node 124-*m* may be implemented for any suitable switch 128 (e.g., any switch 128 coupled to a source node) of the communication network 120.

Figure 3:
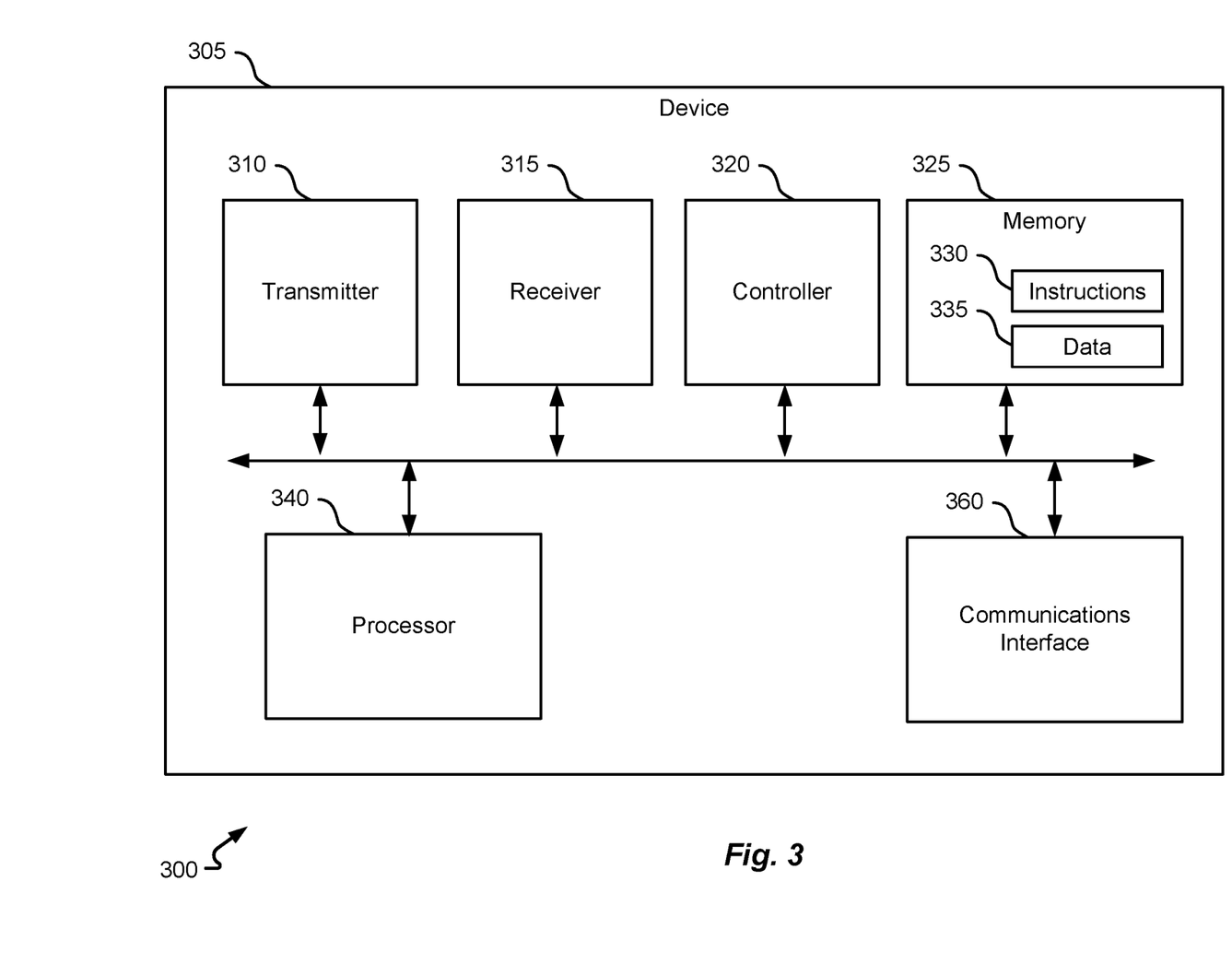
FIG. 3 illustrates a system in accordance with aspects of the present disclosure.

FIG. 3 illustrates an example of a system 300 that supports adaptive routing for asymmetrical topologies in accordance with aspects of the present disclosure. The system 300 may include a device 305. The device 305 may include aspects of a node 124 or a switch 128 described with reference to FIGS. 1 and 2A through 2C. In some cases, the device 305 may be referred to as a computing resource. The device 305 may perform any or all of the operations described in the present disclosure.

The device 305 may include a transmitter 310, a receiver 315, a controller 320, a memory 325, a processor 340, and a communications interface 360. In some examples, components of the device 305 (e.g., transmitter 310, receiver 315, controller 320, memory 325, processor 340, communications interface 360, etc.) may communicate over a system bus (e.g., control busses, address busses, data busses, etc.) included in the device 305.

The transmitter 310 and the receiver 315 may support the transmission and reception of signals to and from the device 305. In some aspects, the transmitter 310 and the receiver 315 may support the transmission and reception of signals within the device 305. The transmitter 310 and receiver 315 may be collectively referred to as a transceiver. An antenna may be electrically coupled to the transceiver. The device 305 may also include (not shown) multiple transmitters 310, multiple receivers 315, multiple transceivers and/or multiple antennas.

The controller 320 may be located on a same chip (e.g., ASIC chip) as the transmitter 310 and/or the receiver 315. In some cases, the controller 320 may be located on a different chip as the transmitter 310 and/or the receiver 315. In some examples, the controller 320 may be located on a chip of or on a chip of another device 305. In some examples, the controller 320 may be a programmed microprocessor or microcontroller. In some aspects, the controller 320 may include one or more CPUs, memory, and programmable I/O peripherals.

The memory 325 may be any suitable electronic component capable of storing electronic information. The memory 325 may be, for example, random access memory (RAM), read-only memory (ROM), magnetic disk storage media, optical storage media, flash memory devices in RAM, on-board memory included with the processor, EPROM memory, EEPROM memory, registers, and so forth, including combinations thereof.

The memory 325 may include instructions 330 (computer readable code) and data 335 stored thereon. The instructions 330 may be executable by the processor 340 to implement the methods disclosed herein. In some aspects, execution of the instructions 330 may involve one or more portions of the data 350. In some examples, when the processor 340 executes the instructions 330, various portions of the instructions 330 and/or the data 335 may be loaded onto the processor 340.

The processor 340 may correspond to one or multiple computer processing devices. For example, the processor 340 may include a silicon chip, such as a Field Programmable Gate Array (FPGA), an ASIC, any other suitable type of Integrated Circuit (IC) chip, a collection of IC chips, or the like. In some aspects, the processors may include a microprocessor, a Central Processing Unit (CPU), a Graphics Processing Unit (GPU), or plurality of microprocessors configured to execute instructions sets stored in a corresponding memory (e.g., memory 325 of the device 305). For example, upon executing the instruction sets stored in memory 325, the processor 340 may enable or perform one or more functions of the device 305. In some examples, a combination of processors 340 (e.g., an advanced reduced instruction set computer (RISC) machine (ARM) and a digital signal processor (DSP) 355) may be implemented in the device 305.

The communications interface 360 may support interactions (e.g., via a physical or virtual interface) between a user and the device 305.

Particular aspects of the subject matter described herein may be implemented to realize increased data transfer rates, increased data throughput, improved allocation of data traffic, and reduced data transfer times.

Figure 4:
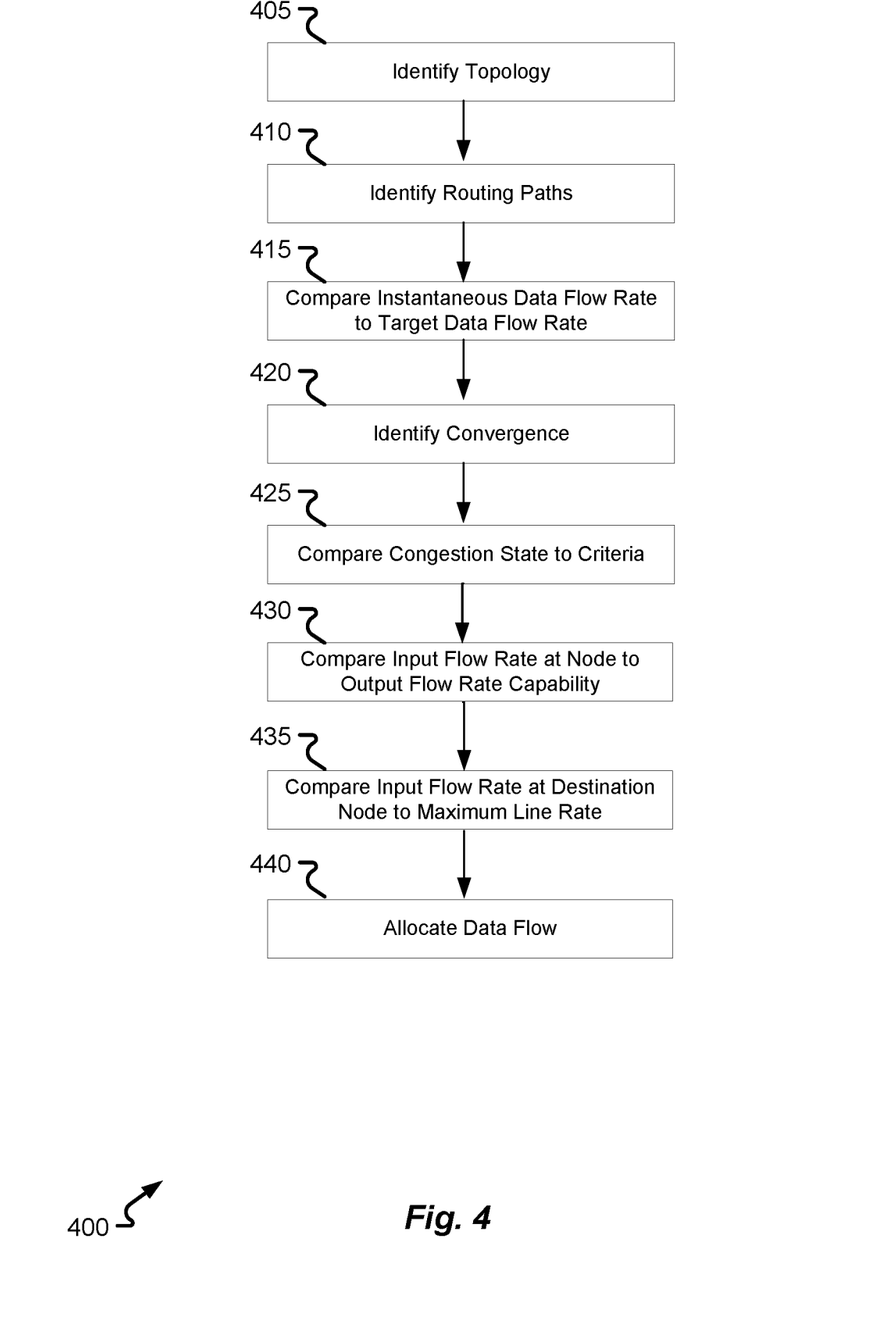
FIG. 4 illustrates an example process flow in accordance with aspects of the present disclosure.

FIG. 4 illustrates an example of a process flow 400 that supports adaptive routing for asymmetrical topologies in accordance with aspects of the present disclosure. In some examples, process flow 400 may implement aspects of the system 100 or device 305 described with reference to FIGS. 1 through 3.

In the following description of the process flow 400, the operations may be performed in a different order than the order shown, or the operations may be performed in different orders or at different times. Certain operations may also be left out of the process flow 400, or other operations may be added to the process flow 400.

It is to be understood that any device (e.g., a node 124 and/or a switch 128 described with reference to FIG. 1, a device 305 described with reference to FIG. 3, etc.) may perform the operations shown.

At 405, the process flow 400 may include identifying a topology associated with a communication network (e.g., communication network 120). In an example, the process flow 400 includes identifying the topology based on traversing the communication network. In another example, identifying the topology includes accessing a data table indicating the topology.

At 410, the process flow 400 may include, for each of two or more switches (e.g., switch 128-a, switch 128-z, etc.) of a communication network: identifying a set of routing paths (e.g., routing paths 152) from the switch to a destination node (e.g., node 124-m) based on a topology associated with the communication network. In an example, the set of routing paths include a first subset (e.g., subset 153-b) of routing paths and a second subset (e.g., subset 153-a) of routing paths, and the topology includes an indication of a convergence of the first subset of routing paths at a node (e.g., switch 128-h) between the switch and the destination node.

At 415, the process flow 400 may include comparing an instantaneous data flow rate of one or more routing paths of the set of routing paths to a target data flow rate (e.g., 100% line rate).

At 420, the process flow 400 may include identifying, based on the topology, the convergence of the first subset of routing paths.

At 425, the process flow 400 may include comparing a congestion state of the communication network to a set of criteria.

At 430, the process flow 400 may include comparing an input flow rate at the node (e.g., switch 128-h) to an output flow rate capability at the node.

At 435, the process flow 400 may include comparing an input flow rate at the destination node (e.g., node 124-m) to a maximum line rate associated with the topology.

At 440, the process flow 400 may include allocating a data flow to a first routing path (e.g., routing path 152-c) of the first subset of routing paths and a second routing path (e.g., routing path 152-a) of the second subset of routing paths according to a target data flow rate (e.g., 100% line rate) common to the first routing path and the second routing path.

In some aspects, allocating the data flow to the first routing path and the second routing path is based on a result of the comparison at 415.

In some other aspects, allocating the data flow to the first routing path and the second routing path is based on identifying the convergence at 420.

In some aspects, the process flow 400 may include selecting between the first routing path and at least one other routing path (e.g., routing path 152-d) of the first subset of routing paths based on the destination node.

In some aspects, the process flow 400 may include disabling a port (e.g., port 168-a) associated with the at least one other routing path. In an example, allocating the data flow to the first routing path (at 440), disabling the port associated with the at least one other routing path, or both is based on a result of the comparison at 425.

In an example, allocating the data flow to the first routing path and the second routing path according to the target data flow rate is based on a result of the comparison at 430.

In some aspects, allocating the data flow to the first routing path and the second routing path according to the target data flow rate is based on a result of the comparison at 435.

In some aspects, the process flow 400 may include offloading data traffic from the at least one other routing path of the first subset of routing paths to the first routing path.

In some aspects, the process flow 400 may include comparing a data throughput value of at least one other routing path (e.g., routing path 152-b) of the second subset of routing paths to a threshold value (e.g., a threshold data throughput value). At 440, the process flow 400 may include allocating the data flow to the at least one other routing path according to the target data flow rate or refraining from allocating the data flow to the at least one other routing path, based on a result of the comparison of the data throughput value to the threshold value.

Any of the steps, functions, and operations discussed herein can be performed continuously and automatically.

The exemplary apparatuses, systems, and methods of this disclosure have been described in relation to examples of a switch 128 and a device 305. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

Other variations are within spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one example, different components of a computer system have separate processors and different processors execute different subsets of instructions.

Accordingly, in at least one example, computer systems are configured to implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An apparatus comprising:
a processor;
memory in electronic communication with the processor; and
instructions stored in the memory, the instructions being executable by the processor to, for each of two or more switches of a communication network:
identify a set of routing paths from a switch in the two or more switches to a destination node based on a topology associated with the communication network, wherein the set of routing paths comprise a first subset of routing paths and a second subset of routing paths, and the topology comprises an indication that the first subset of routing paths converge at an intermediate node between the switch and the destination node;
select a first routing path of the first subset of routing paths and a second routing path of the second subset of routing paths such that, for a data flow to the destination node flowing from the switch through the intermediate node, the first and second routing paths do not converge at the intermediate node;

set a target data flow rate for the data flow to be the same for the first routing path and the second routing path; and allocate the data flow to the first routing path and the second routing path at the target data flow rate.

2. The apparatus of claim 1, wherein the instructions are further executable by the processor to:
compare an instantaneous data flow rate of one or more routing paths of the set of routing paths to the target data flow rate,
wherein allocating the data flow to the first routing path and the second routing path is based on a result of the comparison.

3. The apparatus of claim 1, wherein the instructions are further executable by the processor to:
identify, based on the topology, the convergence of the first subset of routing paths.

4. The apparatus of claim 1, wherein the instructions are further executable by the processor to:
select the first routing path from at least one other routing path of the first subset of routing paths based on the destination node.

5. The apparatus of claim 4, wherein the instructions are further executable by the processor to:
disable a port associated with the at least one other routing path.

6. The apparatus of claim 5, wherein the instructions are further executable by the processor to:
compare a congestion state of the communication network to a set of criteria,
wherein allocating the data flow to the first routing path, disabling the port associated with the at least one other routing path, or both is based on a result of the comparison.

7. The apparatus of claim 1, wherein the instructions are further executable by the processor to:
compare a data throughput value of at least one other routing path of the second subset of routing paths to a threshold value; and
allocate the data flow to the at least one other routing path at the target data flow rate or refrain from allocating the data flow to the at least one other routing path, based on a result of the comparison.

8. The apparatus of claim 1, wherein the instructions are further executable by the processor to:
compare an input flow rate at the intermediate node to an output flow rate capability at the intermediate node,
wherein allocating the data flow to the first routing path and the second routing path at the target data flow rate is based on a result of the comparison.

9. The apparatus of claim 1, wherein the instructions are further executable by the processor to:
offload data traffic from at least one other routing path of the first subset of routing paths to the first routing path.

10. The apparatus of claim 1, wherein the instructions are further executable by the processor to:
compare an input flow rate at the destination node to a maximum line rate associated with the topology,
wherein allocating the data flow to the first routing path and the second routing path at the target data flow rate is based on a result of the comparison.

11. The apparatus of claim 1, wherein the instructions are further executable by the processor to:
identify the topology based on traversing the communication network.

12. The apparatus of claim 1, wherein:
identifying the topology comprises accessing a data table indicating the topology.

13. A system comprising:
a communication network comprising a controller and two or more switches, wherein:
the communication network comprises, for each of the two or more switches, a set of routing paths a destination node;
the set of routing paths comprise:
a first subset of routing paths that converge at an intermediate node between a switch of the two or more switches and the destination node; and
a second subset of routing paths; and
the controller is to:
select a first routing path of the first subset of routing paths and a second routing path of the second subset of routing paths such that, for a data flow to the destination node flowing from the switch through the intermediate node, the first and second routing paths do not converge at the intermediate node;
set a target data flow rate for the data flow to be the same for the first routing path and the second routing path; and
allocate the data flow to the first routing path of and the second routing path at the target data flow rate.

14. The system of claim 13, wherein the controller:
compares an instantaneous data flow rate of one or more routing paths of the set of routing paths to the target data flow rate,
wherein allocating the data flow to the first routing path and the second routing path is based on a result of the comparison.

15. The system of claim 13, wherein:
the controller identifies, based on a topology associated with the communication network, the convergence of the first subset of routing paths.

16. The system of claim 13, wherein:
the controller selects the first routing path from at least one other routing path of the first subset of routing paths based on the destination node.

17. The system of claim 16, wherein the controller:
disables a port associated with the at least one other routing path.

18. The system of claim 17, wherein the controller:
compares an input flow rate at the intermediate node to an output flow rate capability at the intermediate node,
wherein allocating the data flow to the first routing path and the second routing path at the target data flow rate is based on a result of the comparison.

19. The system of claim 13, wherein the controller:
compares an input flow rate at the destination node to a maximum line rate of a topology associated with the communication network,
wherein allocating the data flow to the first routing path and the second routing path at the target data flow rate is based on a result of the comparison.

20. A method comprising:
identifying a set of routing paths from a switch to a destination node based on a topology associated with a communication network, wherein the set of routing paths comprise a first subset of routing paths and a second subset of routing paths, and the topology comprises an indication that the first subset of routing paths converge at an intermediate node between the switch and the destination node;

selecting a first routing path of the first subset of routing paths and a second routing path of the second subset of routing paths such that, for a data flow to the destination node flowing from the switch through the intermediate node, the first and second routing paths do not converge at the intermediate node;

setting a target data flow rate for the data flow to be the same for the first routing path and the second routing path; and allocating the data flow to the first routing path and the second routing path at the target data flow rate.

\* \* \* \* \*